(12) United States Patent
Bizhanzadeh

(10) Patent No.: US 9,242,807 B2
(45) Date of Patent: Jan. 26, 2016

(54) VORTEX PNEUMATIC CONVEYANCE APPARATUS

(76) Inventor: Saeed Bizhanzadeh, Ahvaz (IR)

( * ) Notice: Subject to any disclaimer, the term of this patent is extended or adjusted under 35 U.S.C. 154(b) by 514 days.

(21) Appl. No.: 13/316,125

(22) Filed: Dec. 9, 2011

(65) Prior Publication Data

US 2013/0145573 A1 Jun. 13, 2013

(51) Int. Cl.
| | |
|---|---|
| *B65G 53/14* | (2006.01) |
| *A47L 5/28* | (2006.01) |
| *B65G 53/26* | (2006.01) |
| *A47L 9/12* | (2006.01) |

(52) U.S. Cl.
CPC . *B65G 53/14* (2013.01); *A47L 5/28* (2013.01); *B65G 53/26* (2013.01); *A47L 9/127* (2013.01)

(58) Field of Classification Search
CPC ....... A47L 9/1683; A47L 5/28; A47L 9/1666; A47L 9/1691; A47L 9/127
USPC ........... 15/347, 340.1, 300.1; 406/23, 34, 92, 406/151, 153
See application file for complete search history.

(56) References Cited

U.S. PATENT DOCUMENTS

| | | | | |
|---|---|---|---|---|
| 5,195,852 | A | * | 3/1993 | Malugani et al. ............. 406/153 |
| 5,252,008 | A | * | 10/1993 | May et al. ....................... 406/23 |
| 2008/0230446 | A1 | * | 9/2008 | Bertram et al. ................. 209/10 |

* cited by examiner

*Primary Examiner* — Robert Scruggs
(74) *Attorney, Agent, or Firm* — Van Dyke Law; Raymond Van Dyke

(57) ABSTRACT

The vortex pneumatic conveyance apparatus of the present application creates a vortex from blown and/or pressurized air rotating along the inner wall of an outlet tube to convey particles through a vacuum created within the center of the outlet tube at a relatively high flow rate and pressure. Without the blown and/or pressurized air molecules taking up space and colliding with the particles in the center of the outlet tube and because of the strong suction created by the vortex of air rotating along the inner wall of the outlet tube, the efficiency of the vortex pneumatic conveyance apparatus of this application is improved relative to well-known pneumatic conveyors in which air merely pushes the particles within an outlet tube.

19 Claims, 6 Drawing Sheets

VORTEX PNEUMATIC CONVEYANCE APPARATUS

TECHNICAL FIELD

This application generally relates to pneumatic conveyors, and more particularly relates to a vortex pneumatic conveyance apparatus that creates a vortex to convey particles at a relatively high flow rate and pressure.

BACKGROUND

Many industries produce waste, which can have an undesirable effect on human health and the environment. The collection of industrial waste for disposal or recycling is typically difficult and expensive. Currently, various systems are used to collect waste by using a blower, i.e., pneumatic conveyor, and a filtering means to separate waste from flowing air at the source of the industrial waste. For example, present dust collectors, such as wet dust collectors, dry dust collectors, dust collectors including bag filters, and dust collectors including electromagnetic filters, can be used to separate dust from blown air. In wet dust collectors, for example, a water bath scrubber separates the dust from the blown air and in dust collectors including bag filters, the blown air passes through the pores of a solid membrane to collect the dust.

However, the efficiencies of known dust collectors mostly depend on the efficiency of the filtering means and the lower the efficiency of the filtering means, the more energy and suction pressure is required by the blower. As such, typical blowers are not suitable for many applications due to their weak suction pressure and are not practical in applications that require a large volume of dust collection. The weak suction of typical blowers is due to their poor designs. In examples of typical blowers including fans to create suction, the particles being conveyed collide with the rotating fan blades, which deform or break over time, thereby lowering the suction pressure of the blowers. In other examples of typical blowers using compressed air, the particles being conveyed must travel within the stream of compressed air, thereby lowering the volume of particles that can be sucked.

As such, a new, more efficient pneumatic conveyor is needed to convey particles at a relatively higher flow rate and pressure.

SUMMARY

A vortex pneumatic conveyance apparatus is disclosed. The vortex pneumatic conveyance apparatus includes an inlet tube, the proximal end of the inlet tube defining a particle inlet configured to receive particles to be conveyed, an air inlet located along the inlet tube, the air inlet configured to receive air from an air source, a vortex member located at the distal end of the inlet tube, the vortex member comprising at least two spiral members located on the outside wall of the vortex member, and an outlet tube at least partially extending from the distal end of the vortex member, the proximal end of the outlet tube defining a particle outlet configured to output the particles to be conveyed. The vortex member is configured to direct the air along the at least two spiral members so that the air rotates along the inner wall of the outlet tube and the length of the outlet tube extending from the distal end of the vortex member is at least 40% of the length of the pitch of the air rotating along the inner wall of the outlet tube.

In some implementations, the air received at the air inlet can be pressurized air received from a pressurized air source. The air source can be an air compressor or blower. The air velocity of the air received at the air inlet can be at least two meters per second.

In some implementations, the particles to be conveyed can be gas particles, liquid particles, solid particles, dense particles, sludge, and/or slurry. The vortex pneumatic conveyance apparatus can be configured to be used in dust collectors, sand blasters, water pumps, sludge pumps, vortex tubes, industrial vacuum cleaners, domestic vacuum cleaners, vacuum trucks, or spraying devices.

In some implementations, the inner diameter of the outlet tube can be equal to the outer diameter of the vortex member and the height of the at least two spiral members. The height of the at least two spiral members of the vortex member can be at most 50% or 30% of the inner diameter of the inlet tube. The at least two spiral members located on the outside wall of the vortex member can extend along the entire length of the vortex member. At least four spiral members can be located on the outside wall of the vortex member. The inner diameter of the outlet tube can be consistent along the entire length of the outlet tube.

In some implementations, a tapered cap can be configured to direct the air to the at least two spiral members located on the outside wall of the vortex member. In some implementations, the vortex member can be integral to the inlet tube or separate from and connected to the inlet tube.

A particle conveyance system is also disclosed. The particle conveyance system includes a particle source, at least one vortex pneumatic conveyance apparatus configured to receive particles from the particle source, and a particle collection area configured to receive the particles conveyed from the particle source, the particle collection area including an exhaust. The at least one vortex pneumatic conveyance apparatus includes an inlet tube, the proximal end of the inlet tube defining a particle inlet configured to receive the particles from the particle source, an air inlet located along the inlet tube, the air inlet configured to receive air from an air source, a vortex member located at the distal end of the inlet tube, the vortex member comprising at least two spiral members located on the outside wall of the vortex member, and an outlet tube at least partially extending from the distal end of the vortex member, the proximal end of the outlet tube defining a particle outlet configured to output the particles from the particle source. The vortex member is configured to direct the air along the at least two spiral members so that the air rotates along the inner wall of the outlet tube and the length of the outlet tube extending from the distal end of the vortex member is at least 40% of the length of the pitch of the air rotating along the inner wall of the outlet tube.

In some implementations, the at least one vortex pneumatic conveyance apparatus can include two or more vortex pneumatic conveyance apparatuses connected in series or in parallel.

In some implementations, the particle collection area further can include one or more water spray nozzles configured to settle the particles from the particle source at the bottom of the particle collection area.

Details of one or more implementations and/or embodiments of the vortex pneumatic conveyance apparatus are set forth in the accompanying drawings and the description below. Other aspects that can be implemented will be apparent from the description and drawings, and from the claims.

BRIEF DESCRIPTION OF DRAWINGS

Like reference symbols indicate like elements throughout the specification and drawings.

DETAILED DESCRIPTION

The vortex pneumatic conveyance apparatus of the present application creates a vortex from blown and/or pressurized air rotating along the inner wall of an outlet tube to convey particles through a vacuum created within the center of the outlet tube at a relatively high flow rate and pressure. Without the blown and/or pressurized air molecules taking up space and colliding with the particles in the center of the outlet tube and because of the strong suction created by the vortex of air rotating along the inner wall of the outlet tube, the efficiency of the vortex pneumatic conveyance apparatus of this application is improved relative to well-known pneumatic conveyors in which the air merely pushes the particles within an outlet tube.

In addition to the increased suction pressure and efficiency, other advantages of the vortex pneumatic conveyance apparatus of this application include high reliability as the vortex pneumatic conveyance apparatus does not include any moving parts, high efficiency because there is no filter located in the path of the particles, low cost of manufacture, and the ability install the apparatus further from the particle source, which may be necessary in hazardous operating environments.

Figure 1:
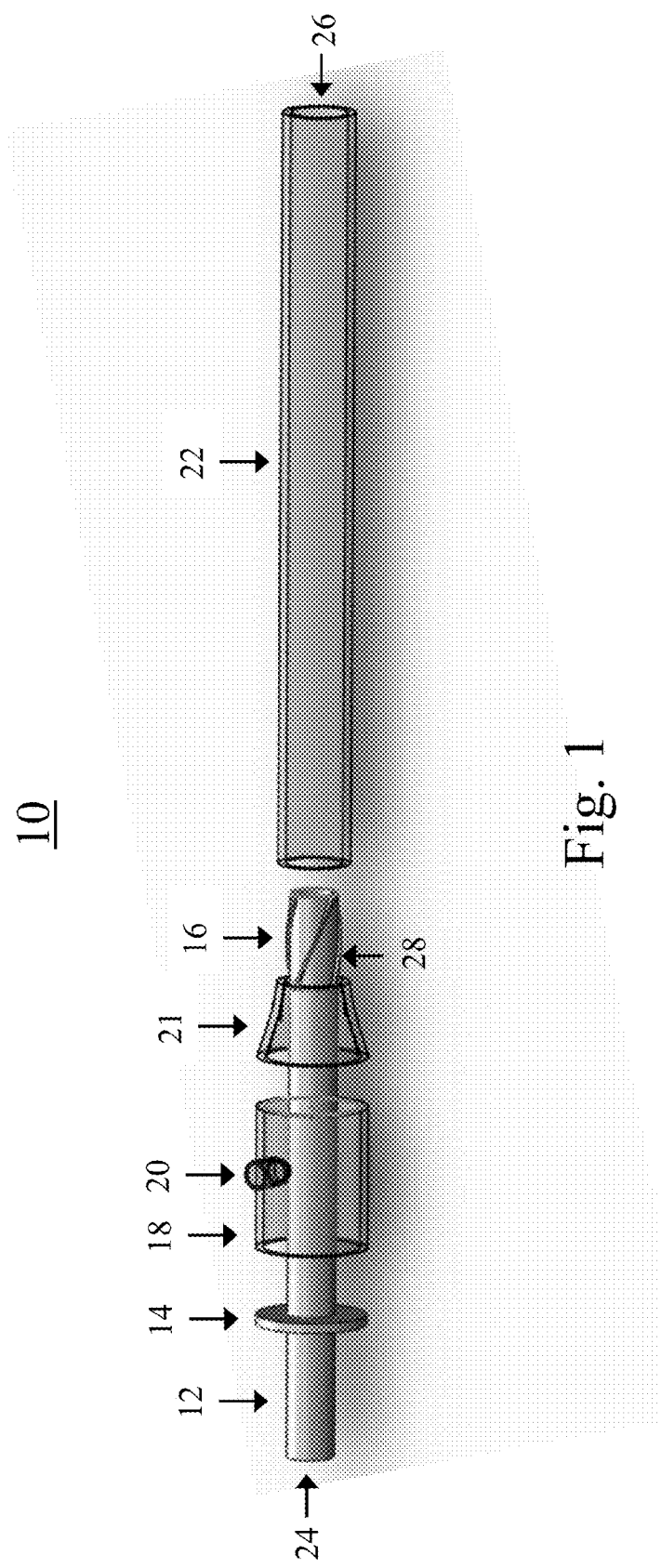
FIG. 1 illustrates the separate parts of an implementation of the vortex pneumatic conveyance apparatus.

Referring to FIG. 1, the separate parts of an implementation of the vortex pneumatic conveyance apparatus 10 are illustrated. Any type of particle can be transferred by the vortex pneumatic conveyance apparatus 10, such as, for example, gas particles, liquid particles, solid particles, dense particles, sludge, and/or slurry. The vortex pneumatic conveyance apparatus 10 includes an inlet tube 12 having a flange 14 near its proximal end and a vortex member 16 including spiral members 28 at its distal end, an air cover tube 18 having an air inlet 20, a tapered cap 21, and an outlet tube 22. The inlet tube 12 defines a particle inlet 24 that receives the particles for conveyance and the outlet tube 22 defines a particle outlet 26 that outputs the particles being conveyed. The air inlet 20 receives air from an air source, such as, for example, an air compressor or blower through a flexible and/or solid tube. In some implementations, the vortex pneumatic conveyance apparatus 10 can be completely or partly made of any strong, stiff, durable, and anticorrosive material, such as, for example, one or more metals, such as iron and/or aluminum, metal alloys, such as steel, plastic, fiberglass, wood, and a combination thereof.

To assemble the vortex pneumatic conveyance apparatus 10, the air cover tube 18 is slid over the vortex member 16 and along the inlet tube 12 to the flange 14. In some implementations, the inner and outer diameters of the air cover tube 18 can be consistent along its length, while in other implementations, the inner diameter and/or outer diameter of the air cover tube 18 can vary along its length. The flange 14 has a diameter equal to or greater than the inner diameter of the air cover tube 18 so that the air flowing into the air inlet 20 cannot escape from the proximal end of the air cover tube 18. Preferably, the flange 14 has a diameter equal to the outer diameter of the air cover tube 18. In some implementations, the air cover tube 18 can be connected to the flange 14 by means of an adhesive, welding, screws, nuts, clamps, and/or other securing means.

Next, the tapered cap 21 is slid over the vortex member 16 and along the inlet tube 12 to the distal end of the air cover tube 18. The inner diameter of the proximal end of the tapered cap 21 is equal to the inner diameter of the distal end of the air cover tube 18 so that the air cannot escape at the point of contact between the tapered cap 21 and the air cover tube 18. Preferably, the outer diameter of the proximal end of the tapered cap 21 is also equal to the outer diameter of the distal end of the air cover tube 18. The tapered cap 21 can be connected to the air cover tube 18 by means of an adhesive, welding, screws, nuts, clamps, and/or other securing means.

Finally, the outlet tube 22 is slid over the vortex member 16 to the distal end of the tapered cap 21. The inner diameter of the proximal end of the outlet tube 22 is equal to the inner diameter of the distal end of the tapered cap 21 so that the air cannot escape at the point of contact between the outlet tube 22 and the tapered cap 21. Preferably, the outer diameter of the proximal end of the outlet tube 22 is also equal to the outer diameter of the distal end of the tapered cap 21. The outlet tube 22 can be connected to the tapered cap 21 by means of an adhesive, welding, screws, nuts, clamps, and/or other securing means.

Figure 2:
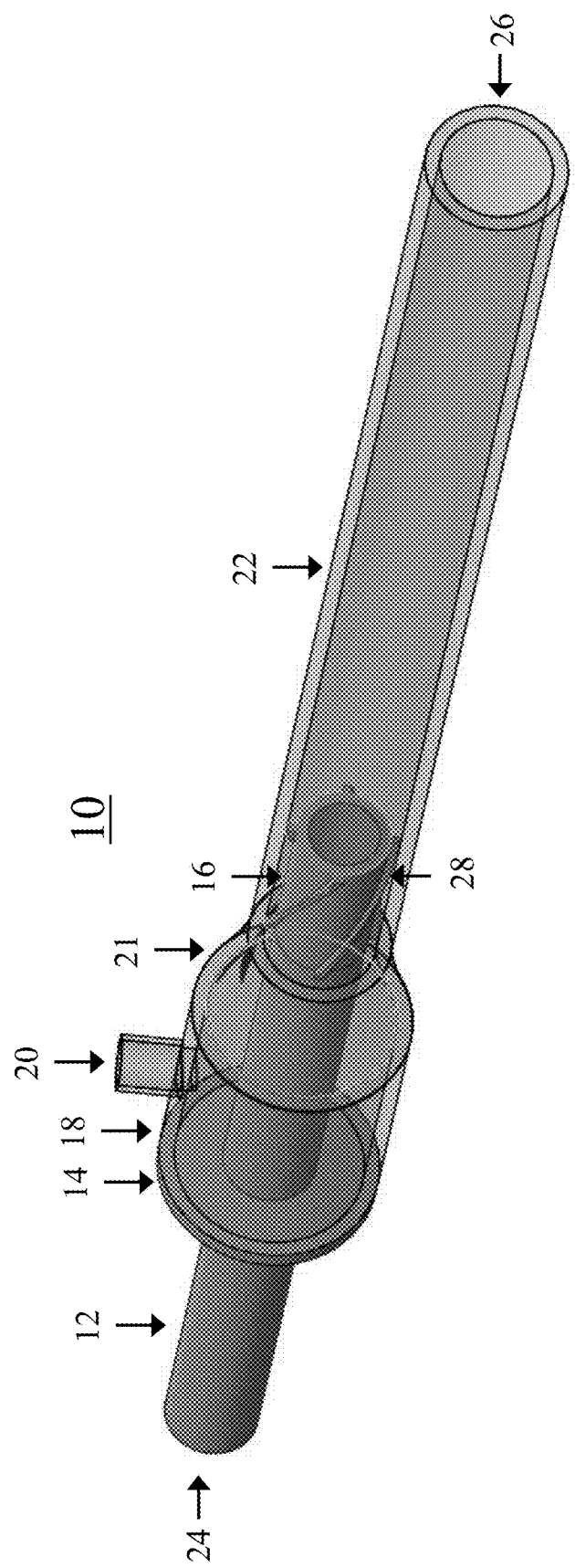
FIG. 2 illustrates a perspective, partially cutaway view of a fully assembled implementation of the vortex pneumatic conveyance apparatus.

In order to achieve the minimum suction pressure, the length of the outlet tube 22 following the distal end of the vortex member 16, i.e., the region in which the air begins to rotate around the inner wall of the outlet tube 22, must be at least 40% of the pitch of the air. In other words, the air must complete almost one-half of a complete rotation following its exit from the vortex member 16 in the outlet tube 22 for the vortex pneumatic conveyance apparatus 10 to achieve its minimum suction pressure. Moreover, the diameter of the outlet tube 22 following the distal end of the vortex member 16 must be uniform in order to achieve suction pressure and must not include any obstruction that can create turbulence such as, for example, a reduction in diameter in the path of the particles by, for example, a diffuser, or a bend and/or curve in the path of the particles. A perspective, partially cutaway view of the fully assembled vortex pneumatic conveyance apparatus 10 is illustrated in FIG. 2.

The vortex member 16 includes two or more and, preferably, four spiral members 28. As illustrated in FIG. 1, the spiral members 28 have a height extending from the outer wall of the vortex member 16 equal to a maximum of 50% of the inner diameter of the inlet tube and, preferably, a maximum of 30% of the inner diameter of the inlet tube. The inner diameter of the distal end of the tapered cap 21, which is equal to the inner diameter of the proximal end of the outlet tube 22, is equal to the outer diameter of the inlet tube 12 plus the height of the spiral members 28 from the outer wall of the inlet tube 12. In some implementations, the vortex member 16 can be integral to the inlet tube 12 while in other implementations, the vortex member 16 can be separate from and connected to the inlet tube 12.

The diameters of the inlet tube 12 and the outlet tube 22 can depend on the suction pressure required to convey the particles, the type of particles being conveyed, and the desired flow rate of particles. For example, the higher the desired flow rate of particles, the larger the diameters of the inlet tube 12 and the outlet tube 22. The length of the vortex member 16 and the pitch of the spiral members 28 can also depend on the pressure required to convey the particles, the type of particles being conveyed, and the desired flow rate. For example, to convey relatively heavy particles, either the pressure and/or air velocity input to the air inlet 20 should be increased or the pitch length of the spiral members 28 should be decreased. In addition, to convey the particles over a longer distance, the pitch length of the spiral members 28 should be increased, which also decreases the suction pressure of the vortex pneumatic conveyance apparatus 10.

Figure 3:
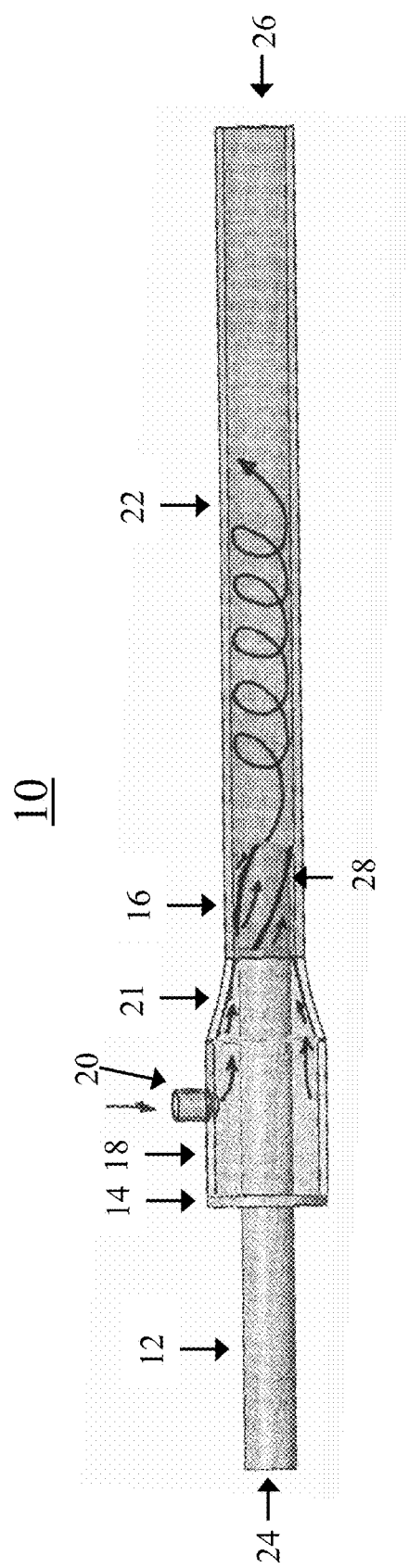
FIG. 3 illustrates a side, partially cutaway view of the flow pattern of air traveling within the implementation of the vortex pneumatic conveyance apparatus.

Referring to FIG. 3, the flow pattern of the air traveling within the vortex pneumatic conveyance apparatus 10 is illustrated by directional arrows within a side, partially cutaway view of the vortex pneumatic conveyance apparatus 10. Initially, the air is received from an air compressor or blower (not shown) into the air inlet 20 of the air cover tube 18. To achieve adequate suction pressure, the velocity of the air input into the air inlet 20 must be at least two meters per second to a maximum of the speed of sound, which is 343.2 meters per second. The greater the air velocity input into the air inlet 20, the greater the suction pressure achieved by the vortex pneumatic conveyance apparatus 10. In some implementations, the air can be pressurized, whereas in other implementations, the air can be unpressurized. The air is forced towards the distal end of the air cover tube 18 by the flange 14 and into the tapered cap 21. The tapered inner walls of the tapered cap 21 direct the air to a small, concentric opening at the distal end of the tapered cap 21 equal to the height of the spiral members 28. The air is then forced against the spiral members 28 which cause the air to rotate around the inner wall of the outlet tube 22, thereby creating a vortex in the outlet tube 22. The vortex causes a low-pressure field, i.e., vacuum, to form in the center of the outlet tube 22, which sucks in air from the inlet tube 12.

Figure 4:
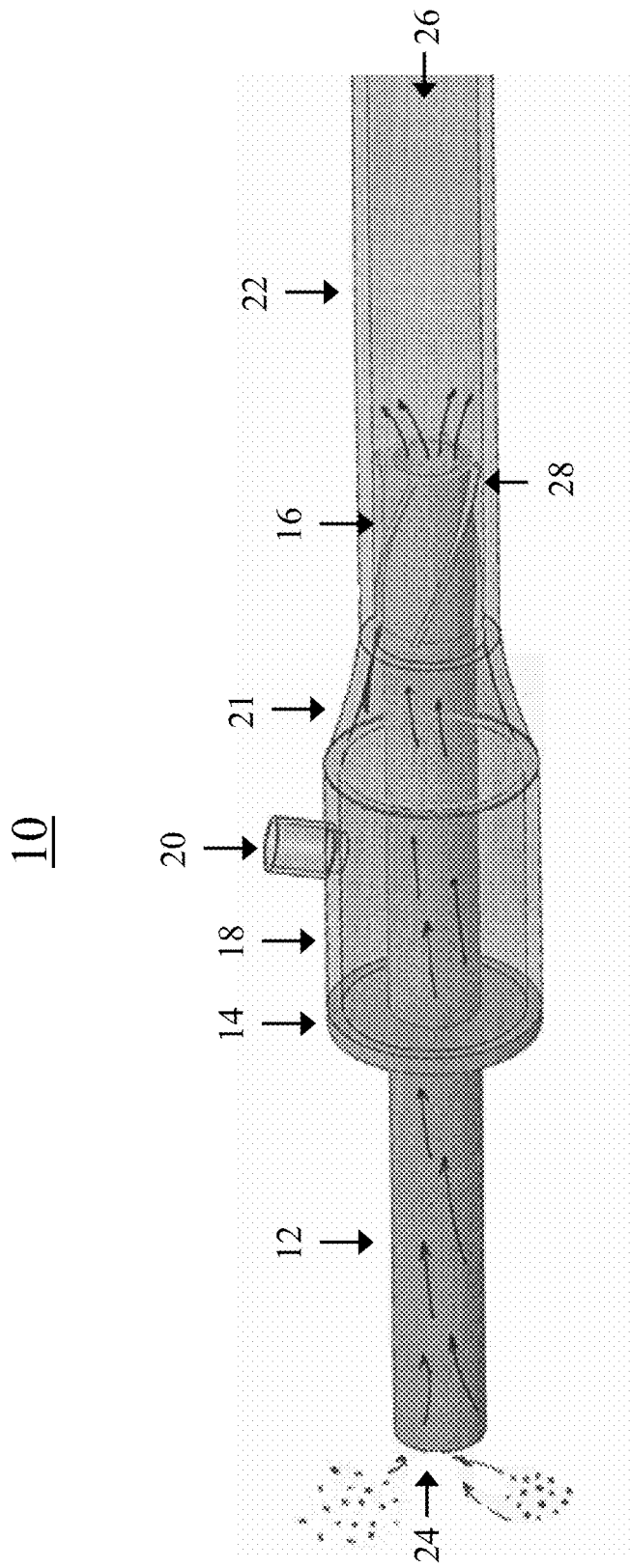
FIG. 4 illustrates a side, partially cutaway view of the flow pattern of particles to be conveyed by the implementation of the vortex pneumatic conveyance apparatus.

Referring to FIG. 4, the flow pattern of the particles to be conveyed by the vortex pneumatic conveyance apparatus 10 is illustrated by directional arrows within a side, partially cutaway view of the vortex pneumatic conveyance apparatus 10. As shown, the particles are initially sucked into the particle inlet 24 and travel through the inlet tube 12, the vortex member 16, and the center of the outlet tube 22. Because the particles travel through the vortex pneumatic conveyance apparatus 10 without obstruction by, for example, a reduction in diameter in the path of the particles by, for example, a diffuser, or a bend and/or curve in the path of the particles, the suction pressure at the particle inlet 24 is the same as the suction pressure at the particle outlet 26. In other words, because the particle path through the vortex pneumatic conveyance apparatus 10 is not impeded, maximum suction pressure is achieved. Moreover, because the air rotates around the inner wall of the outlet tube 22 and does not enter the center of the outlet tube, the air molecules do not take up space or collide with the particles being conveyed in the center of the outlet, thereby achieving maximum suction pressure.

Figure 5:
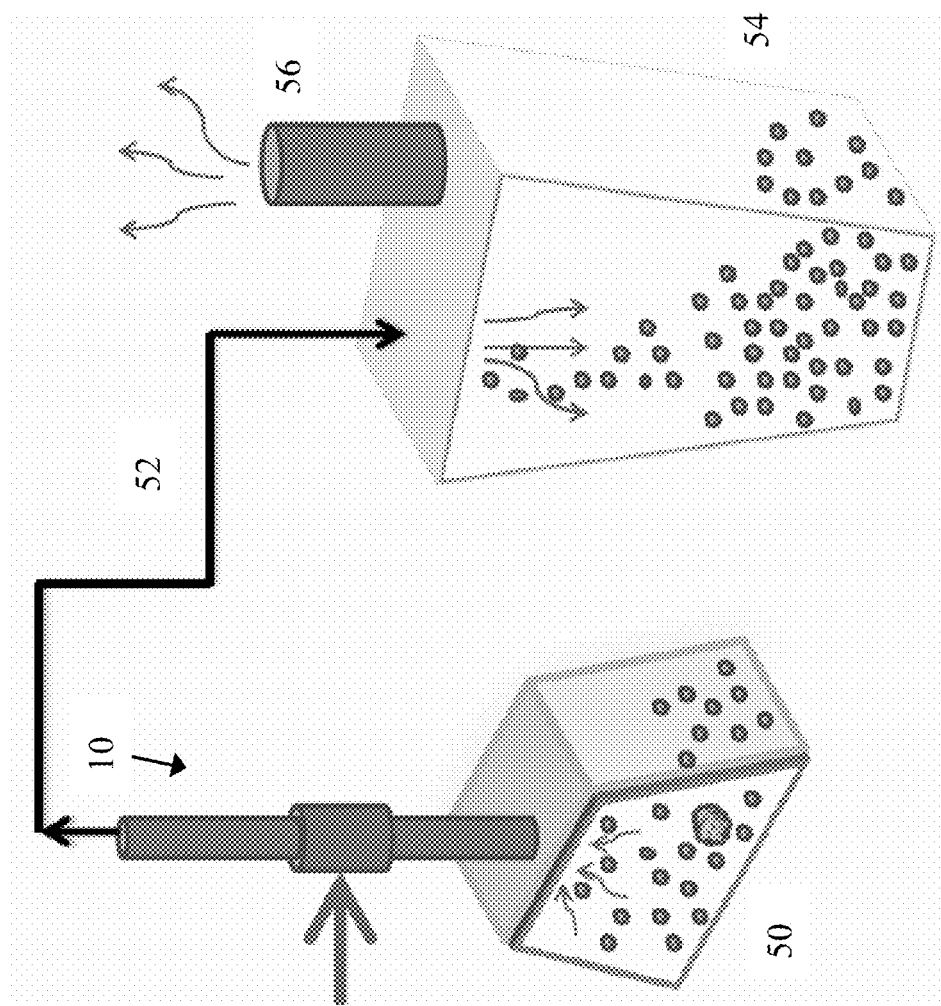
FIG. 5 illustrates an operating environment in which the vortex pneumatic conveyance apparatus can be used to remove particles.

Referring to FIG. 5, an operating environment in which the vortex pneumatic conveyance apparatus 10 can be used to remove particles that may be located in inaccessible and/or hazardous areas is illustrated. As shown, air from a source, such as, for example, an air compressor and/or blower is fed into the vortex pneumatic conveyance apparatus 10. Particles from a particle source 50 are sucked into the vortex pneumatic conveyance apparatus 10 through the particle inlet 24. In some implementations, a hose and/or tube can be connected to the particle inlet 24 in order to extend the length of the inlet tube 12.

The particles sucked into the particle inlet 24 then pass through the vortex pneumatic conveyance apparatus 10 as described above in connection with FIG. 4 and exit the particle outlet 26. In some implementations, a hose and/or tube 52 can be connected to the particle outlet 26 in order to extend the length of the outlet tube 22. Preferably, however, the diameter of any hose and/tube 52 connected to the particle outlet 26 should be equal or greater than the diameter of the particle outlet 26. Because of the suction pressure generated by the vortex pneumatic conveyance apparatus 10, the particles can be conveyed a significant distance and/or altitude.

The particles passing through the hose and/or tube 52 are directed into a particle collection area 54. The particle collection area 54 can include an exhaust 56 at its top to allow air to vent. In some implementations, the particle collection area 54 can include one or more water spray nozzles (not shown) to help settle the particles at the bottom of the particle collection area 54. In some implementations, depending on the pressure of the air leaving the exhaust 56, the exhaust 56 can be connected to the air inlet 20 of another vortex pneumatic conveyance apparatus 10.

Figure 6:
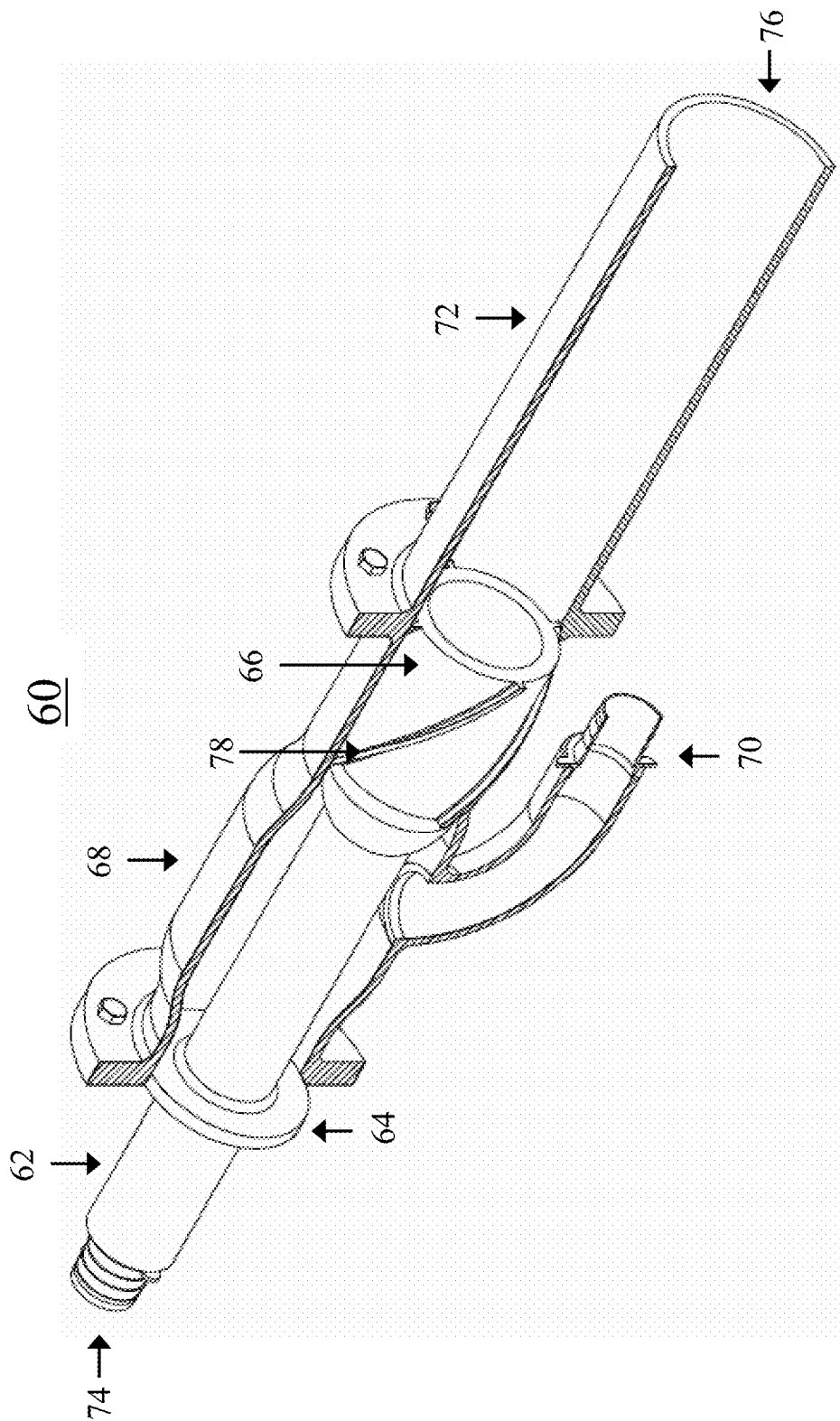
FIG. 6 illustrates a perspective, partially cutaway view of another implementation of a vortex pneumatic conveyance apparatus.

Referring to FIG. 6, a perspective, partially cutaway view of another implementation of a vortex pneumatic conveyance apparatus 60 is illustrated. The vortex pneumatic conveyance apparatus 60 includes an inlet tube 62 having a flange 64 near its proximal end and a vortex member 66 including spiral members 78 at its distal end, an air cover tube 68 having an air inlet 70, and an outlet tube 72. The inlet tube 62 defines a particle inlet 74 that receives the particles for conveyance and the outlet tube 72 defines a particle outlet 76 that outputs the particles being conveyed. The air inlet 70 receives air from, for example, an air compressor and/or blower through a flexible and/or solid tube. The air cover tube 68 is at least tapered at its distal end to direct the air into the spiral members 78 of the vortex member 66. The inlet tube 62 can be connected to the outlet tube 72 by, for example, nuts and bolts. In some implementations, the vortex pneumatic conveyance apparatus 60 can be completely or partly made of any strong, stiff, durable, and anticorrosive material, such as, for example, one or more metals, such as iron and/or aluminum, metal alloys, such as steel, plastic, fiberglass, wood, and a combination thereof.

In some implementations, two or more vortex pneumatic conveyance apparatuses can be used in serial. For example, if the distance that material must be conveyed is more than that which a single vortex pneumatic conveyance apparatus is capable of conveying, multiple vortex pneumatic conveyance apparatuses can be placed at different points in the path of transfer to boost the pressure of conveyance. In one particular example, if the outlet tube of a first vortex pneumatic conveyance apparatus is directly connected to the inlet tube of a second vortex pneumatic conveyance apparatus in series, then the second vortex pneumatic conveyance apparatus must be larger than the first vortex pneumatic conveyance apparatus because the diameter of the inlet tube of the second vortex pneumatic conveyance apparatus must be equal to the outlet tube of the first vortex pneumatic conveyance apparatus, which is larger than the diameter of the inlet tube of the first vortex pneumatic conveyance apparatus by the height of the spiral members.

In some implementations, two or more vortex pneumatic conveyance apparatuses can be used in parallel to increase the amount of material being transferred. In some implementations, if the amount of material to be transferred is being produced at a rate greater than that which a single vortex pneumatic conveyance apparatus can transfer, or if the areas in which the material to be transferred is being produced are spaced apart such that a single vortex pneumatic conveyance apparatus cannot simultaneously access all of those areas, multiple vortex pneumatic conveyance apparatuses can be used in parallel to transfer the material.

In some implementations, a single source of air can be input to the two or more vortex pneumatic conveyance apparatuses, whereas in other implementations, different sources of air can be input to the two or more vortex pneumatic conveyance apparatuses.

The vortex pneumatic conveyance apparatus 10 can be used in a variety of applications, such as, for example, dust collectors, sand blasters, water pumps, sludge pumps, vortex tubes, industrial or domestic vacuum cleaners, vacuum trucks, and spraying devices, such as paint sprayers. The vortex pneumatic conveyance apparatus 10 can be used to transfer granular particles, such as sand, gravel, pebbles, pellets, and/or grains.

In some implementations, rather than receive air in the air inlet 20 from an air compressor and/or blower, the vortex member 16 having the spiral members 28 can be configured to rotate about its horizontal axis to create the at least two meters per second of air flow necessary for suction in the vortex pneumatic conveyance apparatus 10. The vortex member 16 can include a motor, such as an electrical motor, connected to a power source to power its rotation. In addition, the air cover tube 18 and/or the tapered cap 21 can include vents as the sources of air to be blown by the rotating vortex member.

In some implementations, if the difference in air pressure between the particle inlet 24 and the particle outlet 26 is at least one bar, the temperature of the air and particles exiting the particle outlet 26 will be lower than the temperature of the air and particles entering particle inlet 24. Therefore, in some implementations, the vortex pneumatic conveyance apparatus 10 can be used to cool particles or transfer hot particles more safely.

In some implementations, another gas can be input into the air inlet 20 of the vortex pneumatic conveyance apparatus 10 in the place of air depending on the application environment of the vortex pneumatic conveyance apparatus 10. For example, oxygen, nitrogen, helium, and/or argon can be input into the air inlet 20. In some implementations, a liquid, such as, for example, water, can be input into the air inlet 20 of the vortex pneumatic conveyance apparatus 10 in the place of air.

In some implementations, another structure that is capable of rotating the air around the inner wall of the outlet tube 22 can be used in place of the vortex member 16 having the spiral members 28 in the vortex pneumatic conveyance apparatus 10. For example, one or more curved channels can be defined in a hollow cylinder and used in place of the vortex member 16 to rotate the air around the inner wall of the outlet tube 22 and create a vortex within the outlet tube 22.

It is to be understood that the disclosed implementations are not limited to the particular processes, devices, and/or apparatus described which may, of course, vary. It is also to be understood that the terminology used herein is for the purpose of describing particular embodiments only, and is not intended to be limiting. As used in this application, the singular forms "a," "an," and "the" include plural referents unless the content clearly indicates otherwise.

Reference in the specification to "one implementation" or "an implementation" means that a particular feature, structure, characteristic, or function described in connection with the implementation is included in at least one implementation herein. The appearances of the phrase "in some implementations" in the specification do not necessarily all refer to the same implementation.

Accordingly, other embodiments and/or implementations are within the scope of this application.

What is claimed is:

1. A vortex pneumatic conveyance apparatus, comprising:
   an inlet tube, the proximal end of the inlet tube defining a particle inlet configured to receive particles to be conveyed;
   an air inlet located along the inlet tube, the air inlet configured to receive air from an air source;
   a vortex member located at the distal end of the inlet tube, the vortex member comprising at least two spiral members located on the outside wall of the vortex member; and
   an outlet tube at least partially extending from the distal end of the vortex member, the proximal end of the outlet tube defining a particle outlet configured to output the particles to be conveyed,
   wherein the vortex member is configured to direct the air along the at least two spiral members so that the air rotates along the inner wall of the outlet tube,
   wherein the length of the outlet tube extending from the distal end of the vortex member is at least 40% of the length of the pitch of the air rotating along the inner wall of the outlet tube, and
   wherein said outlet tube is made of a stiff material, the diameter of said inner wall of the outlet tube is uniform and the inner wall extending from said vortex member without a bend, curve or obstruction therealong.

2. The vortex pneumatic conveyance apparatus of claim 1, wherein the air received at the air inlet is pressurized air received from a pressurized air source.

3. The vortex pneumatic conveyance apparatus of claim 1, wherein the inner diameter of the outlet tube is equal to the outer diameter of the vortex member and the height of the at least two spiral members.

4. The vortex pneumatic conveyance apparatus of claim 1, wherein the height of the at least two spiral members of the vortex member is at most 50% of the inner diameter of the inlet tube.

5. The vortex pneumatic conveyance apparatus of claim 4, wherein the height of the at least two spiral members of the vortex member is at most 30% of the inner diameter of the inlet tube.

6. The vortex pneumatic conveyance apparatus of claim 1, further comprising:
   a tapered cap configured to direct the air to the at least two spiral members located on the outside wall of the vortex member.

7. The vortex pneumatic conveyance apparatus of claim 1, wherein the inner diameter of the outlet tube is consistent along the entire length of the outlet tube.

8. The vortex pneumatic conveyance apparatus of claim 1, wherein the vortex member comprises at least four spiral members located on the outside wall of the vortex member.

9. The vortex pneumatic conveyance apparatus of claim 1, wherein the at least two spiral members located on the outside wall of the vortex member extend along the entire length of the vortex member.

10. The vortex pneumatic conveyance apparatus of claim 1, wherein the vortex member is integral to the inlet tube.

11. The vortex pneumatic conveyance apparatus of claim 1, wherein the vortex member is separate from and connected to the inlet tube.

12. The vortex pneumatic conveyance apparatus of claim 1, wherein the air source comprises an air compressor or blower.

13. The vortex pneumatic conveyance apparatus of claim 1, wherein the air velocity of the air received at the air inlet is at least two meters per second.

14. The vortex pneumatic conveyance apparatus of claim 1, wherein the particles to be conveyed comprise gas particles, liquid particles, solid particles, dense particles, sludge, and/or slurry.

15. The vortex pneumatic conveyance apparatus of claim 1, wherein the vortex pneumatic conveyance apparatus is configured to be used in dust collectors, sand blasters, water pumps, sludge pumps, vortex tubes, industrial vacuum cleaners, domestic vacuum cleaners, vacuum trucks, or spraying devices.

16. A particle conveyance system, comprising:
   a particle source;
   at least one vortex pneumatic conveyance apparatus configured to receive particles from the particle source, each vortex pneumatic conveyance apparatus comprising:
      an inlet tube, the proximal end of the inlet tube defining a particle inlet configured to receive the particles from the particle source;
      an air inlet located along the inlet tube, the air inlet configured to receive air from an air source;
      a vortex member located at the distal end of the inlet tube, the vortex member comprising at least two spiral members located on the outside wall of the vortex member; and
      an outlet tube at least partially extending from the distal end of the vortex member, the proximal end of the outlet tube defining a particle outlet configured to output the particles from the particle source,
      wherein the vortex member is configured to direct the air along the at least two spiral members so that the air rotates along the inner wall of the outlet tube, and the length of the outlet tube extending from the distal end of the vortex member is at least 40% of the length of the pitch of the air rotating along the inner wall of the outlet tube, and
      wherein said outlet tube is made of a stiff material, the diameter of said inner wall of the outlet tube is uniform and the inner wall extending from said vortex member without a bend, curve or obstruction therealong; and
   a particle collection area configured to receive the particles conveyed from the particle source, the particle collection area comprising an exhaust.

17. The particle conveyance system of claim 16, wherein the at least one vortex pneumatic conveyance apparatus configured to receive the particles from the particle source comprises two or more vortex pneumatic conveyance apparatuses connected in series.

18. The particle conveyance system of claim 16, wherein the at least one vortex pneumatic conveyance apparatus configured to receive the particles from the particle source comprises two or more vortex pneumatic conveyance apparatuses connected in parallel.

19. The particle conveyance system of claim 16, wherein the particle collection area further comprises one or more water spray nozzles configured to settle the particles from the particle source at the bottom of the particle collection area.

* * * * *